United States Patent [19]
Okada

[11] 4,289,327
[45] Sep. 15, 1981

[54] AIR BAG DEVICE FOR CARS

[75] Inventor: Motohiro Okada, Asaka, Japan

[73] Assignee: Honda Giken Kogyo Kabushiki Kaisha, Tokyo, Japan

[21] Appl. No.: 55,458

[22] Filed: Jul. 6, 1979

Related U.S. Application Data

[62] Division of Ser. No. 854,337, Nov. 23, 1977, Pat. No. 4,203,616.

[30] Foreign Application Priority Data

Feb. 8, 1977 [JP] Japan .................................. 52/12882

[51] Int. Cl.³ .............................................. B60R 21/08
[52] U.S. Cl. ...................................... 280/737; 137/69; 222/3
[58] Field of Search .................. 280/736, 737; 137/69, 137/68 R, 68 A; 222/3, 5

[56] References Cited

U.S. PATENT DOCUMENTS

| | | | |
|---|---|---|---|
| 2,098,399 | 11/1937 | Munson | 220/89 A |
| 3,095,901 | 7/1963 | Larson | 280/736 |
| 3,109,555 | 11/1963 | Samans | 220/89 A |
| 3,209,937 | 10/1965 | Hirst | 137/69 |
| 3,445,032 | 5/1969 | Raidl | 220/89 A |
| 3,463,351 | 8/1969 | Mills | 220/89 A |
| 3,743,318 | 7/1973 | Yamaguchi | 137/68 A |
| 3,744,816 | 7/1973 | Yamaguchi | 137/68 A |
| 3,900,211 | 8/1975 | Russell | 280/737 |

*Primary Examiner*—John P. Silverstrim
*Attorney, Agent, or Firm*—Irving M. Weiner; Pamela S. Burt; John L. Shortley

[57] ABSTRACT

An entirely mechanical air bag device for cars wherein a frangible lid seals a container having gas under pressure therein. The frangible lid is supported by a pressing lid in contact with a link mechanism. During a crash, an impact detecting assembly releases the link mechanism which in turn releases the pressing lid which permits the frangible lid to be fractured by the high pressure gas to inflate the bag.

6 Claims, 5 Drawing Figures

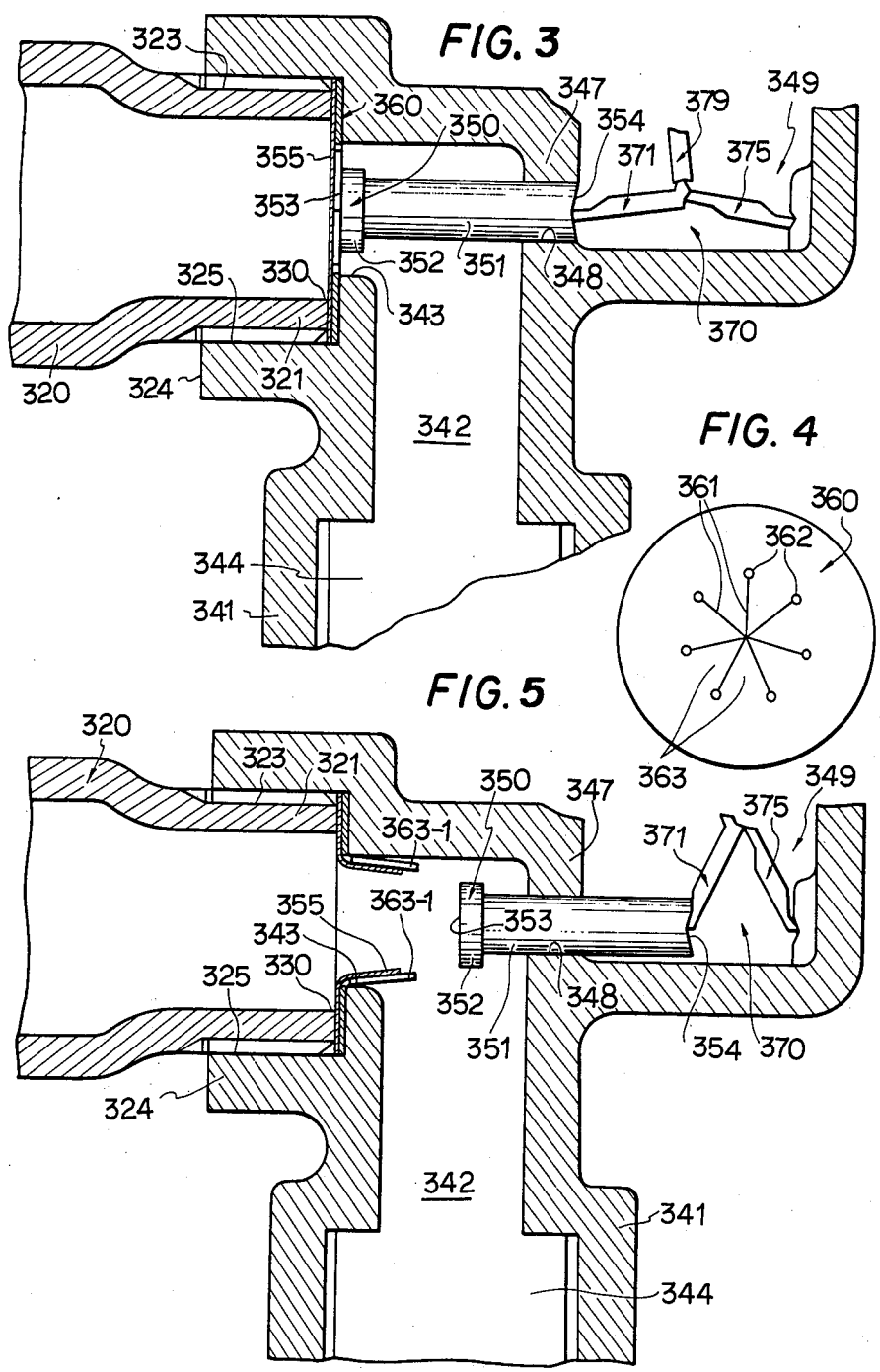

AIR BAG DEVICE FOR CARS

This is a division of Ser. No. 854,337, filed Nov. 23, 1977, now U.S. Pat. No. 4,203,616 issued on May 20, 1980.

BACKGROUND OF THE INVENTION

1. Field of the Invention

This invention relates to air bag devices for automobiles whereby air bags can be entirely mechanically started.

More particularly, the invention relates to an air bag device wherein an opening part of a pressure gas container provided with an opening communicating with an air bag is tightly sealed with a frangible inner lid.

2. Description of Relevant Art

There is already known an air bag device for automobiles which detects the magnitude of an impact at the time of a collision of an automobile to start a gas generator in case the detected value is larger than a set value, to thereby inflate an air bag. The inflated air bag will reduce the impact to which the occupants are subjected, and the device will thus increase the safety of the automobile. Such an air bag device comprises an air bag, a gas generator, gas generation starting means, and impact detecting means.

Such known air bag device is generally of an electric fuse type which has many components and much wiring. The wiring and installation must be made very carefully and the cost is high. In addition, wiring breaks and circuit trouble are likely to occur at the time of a collision. Thus, there is also a problem in reliability.

Therefore, in an air bag device it is required that the device for starting the air bag should be activated at the time of a collision, and should have a structure as simple as possible. It should also have few parts, should be low in cost, should detect an impact, and should operate very quickly on the basis of a detected result. Also, it should inflate the air bag, should be positive in operation, should operate under any conditions, should be high in reliability, and should be able to be easily installed in an automobile by being assembled as a unit without requiring many pipings and wirings.

It is also preferable that the device be entirely mechanical while guaranteeing positive operation. It is also desirable that circuit trouble such as is caused by a long waiting period as in an electric type will not occur. There should be no delay and failure of the operation by the failure of the ignition due to hygroscopicity as in a type using a powder. There should be no need for inspection, replacement, and service of an impact detecting and transmitting system for preventing such delay and failure of operation.

It is also preferable that the gas generator should be so close that the operation of the detecting means may be transmitted directly to it to start the device.

It is also preferable that the device fitting space in the automobile should be as small as possible with respect to other mechanisms and parts. If there are many parts and pipes and wiring are required, a large space will be required. If the entire device including the piping and wiring fitting means and starting means is made large, it will not be easy to obtain the fitting space. It should not be necessary to alter the structure of the car body and to move and modify the instruments in the fitting, piping and wiring parts. Therefore, it is preferable to make the device small.

SUMMARY OF THE INVENTION

The present invention provides an air bag device having a container for being charged with gas under pressure. The gas container is provided with an opening portion communicating with an air bag. The device also includes a pressing lid, and a frangible lid disposed between the pressing lid and the gas container. The opening portion of the gas container is tightly sealed by the frangible lid. The frangible lid is supported on one surface thereof by the pressing lid. The pressing lid is provided with an area contacting the frangible lid which is larger than is necessary to prevent fracture of the frangible lid by the gas under pressure. A link mechanism supports the pressure from the pressing lid. An impact detecting means releases the link mechanism when an impact is detected.

An object of the invention is to provide an air bag device for cars wherein an opening part of a pressure gas container provided with an opening communicating with an air bag is tightly sealed with a frangible inner lid. This inner lid is supported on the outside with a pressing lid having a contact area larger than is necessary and sufficient to prevent its fracture. Pressure applied to this pressing lid is supported with a link mechanism. The link mechanism is released by the detection of a collision which exceeds the predetermined threshold.

Another object is to provide an air bag device wherein an opening part of a pressure gas container is interrupted by an inner lid, a sealing plate, and a pressing lid supported by a link mechanism as a valve. The pressing lid is released by the release of a supporting link by a collision detecting means connected to the link mechanism. Upon upon crashing of the car, the inner lid is fractured by the gas pressure, and the air bag is filled with the gas, so that an air bag starting device may be formed to be simple and compact in structure.

A further object is to provide an air bag device wherein the inflating operation when required of the air bag, together with the pressure gas reaction of the pressing lid, can be made quickly and positively, and the reliability is high.

An object of the invention is to provide together with the above-mentioned objects an air bag device which can be installed in a minimum space without modifying the body and instruments of the automobile and without changing the instrument fitting positions. With the present invention, inspection and replacement is reduced to a minimum.

One embodiment the invention comprises an inner lid such as a sealing plate made of a frangible metallic lamina to be set between a pressure gas outlet of a pressure gas container and an inlet of an air bag. A pressing lid is located outside this inner lid, contacting a considerable area on the outside surface of the inner lid and supporting the inner lid to prevent its fracture. A link mechanism supports the pressing lid against the force in the fracturing direction of the inner lid. The link mechanism is released by an impact detecting means upon detecting a crash, and releases the support of the pressing lid. When the support by the link is released, the pressing lid will retreat to open the opening with the fracture of the inner lid and the jetted pressure of the gas. This opening operation is made quickly and positively. The pressing lid has a supporting part formed integrally with it in relation to the link mechanism. This supporting part is locked with the link mechanism started by the impact detecting means. Further, the invention includes means wherein a plate having incisions is applied to the outside surface of the inner lid and is pressed on the outside surface with the pressing lid so that, when the pressing lid is released and the inner lid is fractured, the plate may be turned outwardly through the incisions. Thus, the inner lid is prevented from being flown by the jetting gas, to protect the air bag.

Thus, according to the present invention, the valve mechanism located between the gas container and the air bag to interrupt them from each other can be made as simple and compact as possible.

Preferred embodiments of the present invention shall be explained in detail in the following with reference to the accompanying drawings so that further concrete objects and advantages of the present invention may become clear.

BRIEF DESCRIPTION OF THE DRAWINGS

FIG. 3 is a view of another embodiment of the invention.

FIG. 4 is an elevational view of a broken-piece-preventing plate provided on the outside surface of the inner lid of the embodiment of FIG. 3.

FIG. 5 shows the FIG. 3 device with the inner lid fractured.

DETAILED DESCRIPTION

Figure 1:
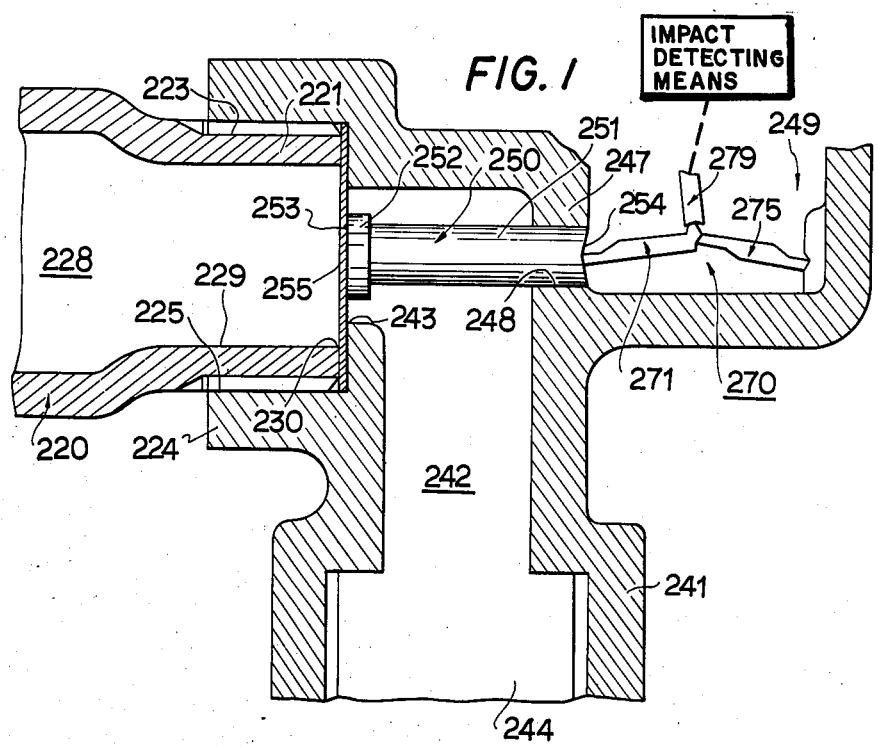
FIG. 1 is a vertically sectioned side view showing an air bag device according to the invention.
Figure 2:
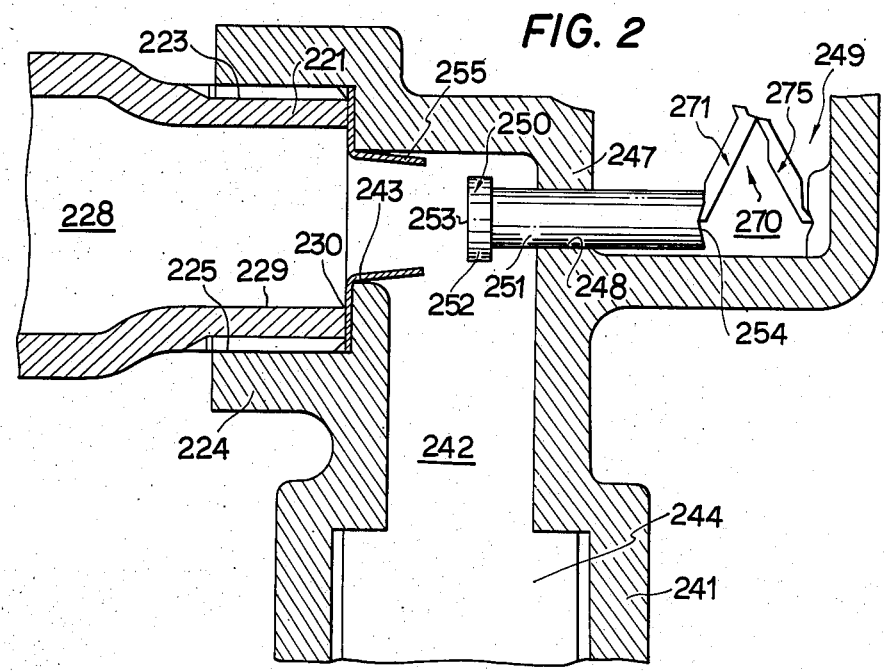
FIG. 2 shows the FIG. 1 device with an inner lid fractured.

With reference to FIGS. 1 and 2, a container 220 charged with a high pressure gas is connected directly with a body 241 provided with an L-shaped passage 242. A male screw part 223 is formed in the tip part 221 of container 220, and is threaded to a female screw part 225 provided in the inside diameter part of an integrally provided L-shaped bent neck part 224 so that a chamber 228 within container 220 may communicate with an inlet 243 of passage 242 through a passage 229 in the tip part. Inlet 243 is connected with a mouth 230 at the tip of the container through a frangible inner lid 255. The lid 255 is formed of a thin metal plate or the like, and is so frangible as to be instantaneously fractured by the gas pressure within the container 220 when lid 255 is not supported by the pressing lid as described hereinbelow. Lid 255 is fitted by being held in its peripheral side part between the end surface of tip 221 and the base end of screw hole 225. Passage 242 is L-shaped. Inlet 243 faces the lid 255. An air bag (not shown) is connected to a screw opening 244 forming a downwardly directed outlet through a fitting metal piece or the like.

The pressing lid 250 is provided in the direction horizontal to the drawing. The body 252 of lid 250 is opposed to lid 255, and the outside diameter of body 252 is substantially smaller than the diameter of inlet 243. As shown in FIG. 5, the outer periphery of body 252 is thus spaced inwardly a substantial distance from the inner surface of inlet 243 so as to define a definite annular space between body 252 and inlet 243. The pressing surface 253 of lid 250 presses and contacts the central part of the outer surface of lid 255, and does not support all of lid 255 facing the inlet 243 but presses, contacts and supports the area necessary and sufficient to prevent fracture of lid 255 and to thus prevent any gas from being fed into the air bag. A rod 251 is provided integrally with body 252, is extended rearwardly, and is slidably fitted in its rear part in a guide hole 248 made in the front wall 247 of the case 249. The rear end of rod 251 faces a space within case 249. A link 271 of a link mechanism 270 engages at one end with an engaging recess 254 made at the rear end of rod 251. Pressing lid 250, via rod 251, is supported by means for applying pressure thereto, such as a combination of the same link sets (not illustrated) as disclosed in the aforesaid U.S. Pat. No. 4,023,616, including links 271, 275 and 279.

When a crash of the automobile is sufficiently great to require the air bag, the regulation of mechanism 270 will be released by impact detecting and starting means such as disclosed in the aforesaid U.S. Pat. No. 4,203,616, and the support of the pressing lid 250 and inner lid 255 will be released by it. As a result, lid 250 will retreat, rod 251 will advance into case 249, the lid 255 will be fractured by the action of the high gas pressure within container 220, and the gas will be fed into the air bag through passage 242 and opening 244. This condition is shown in FIG. 6.

Because the outside diameter of body 252 of pressing lid 250 is smaller than the diameter of inlet 243 and the pressing surface 253 presses and contacts only the central part of the outer surface of inner lid 255, the FIGS. 5 and 6 embodiment of the invention will perform a pressure relieving function similar to that performed by recess 58 and hole 59 in FIG. 4. In other words, if the pressure of the high pressure gas within container 220 becomes abnormally high, the frangible outer peripheral part of inner lid 255, which faces the annular space defined between body 252 and inlet 243, may be fractured so as to prevent fracturing of container 200 while the supported central part of inner lid 255 will remain in contact with and supported by body 252 of pressing lid 250. The high pressure gas will thus be gradually discharged through the annular space defined between body 252 of pressing lid 250 and the inlet 243, and the air bag will be prevented from being suddenly inflated by an abnormal rise in gas pressure other than at the time of a crash, thus preventing interference with the normal operation of the car.

FIGS. 9 to 11 show another embodiment of the invention. The container, structure of fitting the container to the body, link mechanism and pressing lid are the same as in the above-described embodiment. Corresponding parts are indicated by reference numerals in the 300s by replacing the first numeral 2 with the numeral 3.

A screw part 323 provided on the tip part 321 of a container 320 is threaded into a screw hole 325 in the neck part 324 of a body 341. An inner lid 355 is inserted between the end surface of tip 321 and the end part of hole 325. A protective plate 360 is applied to the outer surface of lid 355, and is overlapped on lid 355 so that lid 355 and plate 360 may be held together between the openings 330 and 343.

Plate 360 is as shown in FIG. 10, and is formed of a somewhat stiff metal plate or lamina to be disk-shaped. A plurality of incisions 361 are formed radially from the center through the inside and outside surfaces of plate 360 so that the central part is easily bent outwardly when lid 355 is opened. Circular cuts 362 are formed in the base parts of incisions 361 to make bending easy, and therefore the central part is cut into a plurality of pieces 363.

Pressing surface 353 of the body 352 of a pressing lid 350 presses and contacts the central part of plate 360, with body 352 having an outside diameter smaller than the diameter of inlet 343. Lid 355 is located inside plate 360. Rod 351 of lid 350 passes through a hole 348 in the front wall 347. Its rear end faces the space in the case 349. An engaging recess 354 at the rear end engages with a link 371 of a link mechanism, 370, and the links 371, 375 and 379 are formed as already described.

When mechanism 370 is released by a collision of the automobile, lid 350 will retreat and the released lid 355 will be fractured. By the gas pressure with the fracture of lid 355, the pieces 363 will be turned and bent outwardly. Thus, pieces of fractured parts of lid 355 will be prevented from being blown and passing through passage 342 and outlet 344 together with the gas entering the air bag. Damage to the air bag or the clogging of the nozzle with flying pieces of the inner lid will be prevented, and the air bag will be able to be safely and positively inflated. This condition is shown in FIG. 11.

Thus, according to this embodiment, damage to the air bag or the like by the flying of the small pieces made when the inner lid is fractured can be effectively prevented. The safety and reliability of the operation of the air bag device can be improved by adding such protective plate as is mentioned above without modifying the fundamental structure.

The link mechanism can be properly selected, and the impact detecting and link release starting means can be properly selected, without being limited to the above described embodiments.

I claim:

1. An air bag device, comprising:
   a container for being charged with a gas under pressure;
   said gas container including an opening portion communicating with an air bag;
   a pressing lid;
   a frangible lid disposed between said pressing lid and said gas container;
   said opening portion of said gas container being tightly sealed by said frangible lid;
   said pressing lid being provided in an inlet portion of a passage connecting said opening portion of said container with an inlet of the air bag;
   said pressing lid including a body portion having an outside diameter substantially smaller than the diameter of said inlet portion of said passage, such that the outer periphery of said body portion is substantially spaced apart inwardly from said inlet portion so as to define a definite annular space between said body portion of said pressing lid and said inlet portion of said passage;
   said frangible lid being disposed so as to face said inlet portion of said passage and being supported on only a central part of one surface thereof by said body portion of said pressing lid;
   said frangible lid having an outer peripheral part facing said annular space around said body portion of said pressing lid;
   said body portion of said pressing lid being provided with a pressing surface contacting only said central part of said frangible lid which is sufficiently large to prevent fracture of said frangible lid by said gas under pressure only when the pressure of said gas is within a normal range;
   said outer peripheral part of said frangible lid being partially fracturable when the pressure of said gas becomes abnormally high so as to permit gradual discharge of the high pressure gas through said annular space, with said central part of said frangible lid remaining supported by said body portion of said pressing lid;
   means for applying pressure to said pressing lid; and
   impact detecting means for releasing said link mechanism.

2. An air bag device according to claim 1, wherein:
   said pressing lid further includes a rod integrally formed with said body portion; and
   said means for applying pressure to said pressing lid cooperates with said rod of said pressing lid.

3. An air bag device according to claim 1, wherein:
   a protective plate having pieces bendable in the pressure gas jetting direction is provided between said frangible lid and said pressing lid.

4. An air bag device according to claim 3, wherein:
   said protective plate is provided with radial incisions joining together at its center and passing in the forward and rearward directions to form divided pieces connected with each other on its outer peripheral side.

5. An air bag device according to claim 3, wherein:
   said protective plate is provided with radial incisions joining together at its center and passing in the forward and rearward directions to form divided pieces connected with each other on the outer peripheral side of said plate so that said divided pieces are bendable in the pressure direction by said incisions and cuts.

6. An air bag device according to claim 3, wherein:
   said frangible and said protective plates are held on the outer peripheral side between said opening portion of said gas container and said inlet portion of said passage.

* * * * *